United States Patent
Graham

(10) Patent No.: US 7,397,461 B1
(45) Date of Patent: Jul. 8, 2008

(54) MIRRORED DECORATIVE VIDEO DISPLAY CONCEALMENT AND COOLING APPARATUS AND METHOD

(76) Inventor: Jonathan W. Graham, 1020 SE. 11th St., Fort Lauderdale, FL (US) 33316

( * ) Notice: Subject to any disclaimer, the term of this patent is extended or adjusted under 35 U.S.C. 154(b) by 702 days.

(21) Appl. No.: 11/082,609

(22) Filed: Mar. 17, 2005

(51) Int. Cl.
G09G 5/00 (2006.01)
G06F 1/16 (2006.01)
H05K 7/20 (2006.01)

(52) U.S. Cl. .................. 345/156; 345/905; 361/681; 361/694; 361/695; 348/789; 348/794; 348/795; 349/57; 349/58; 349/114

(58) Field of Classification Search .......... 345/156, 345/905; 361/681, 687, 688, 695, 694, 707, 361/710, 724; 348/748, 789, 794, 795; 349/58, 349/57, 62, 66, 67, 114, 161; 312/22, 406, 312/406.1, 236, 242, 245; 40/700, 798
See application file for complete search history.

(56) References Cited

U.S. PATENT DOCUMENTS 5,264,765 A * 11/1993 Pecorino et al. ........... 318/265
6,480,243 B2 * 11/2002 Yamamoto ................ 348/836
6,901,987 B1 * 6/2005 Graham ................... 160/121.1
7,312,836 B2 * 12/2007 Maxson .................... 348/825

FOREIGN PATENT DOCUMENTS

JP          411015392     * 1/1999

* cited by examiner

Primary Examiner—Henry N Tran
(74) Attorney, Agent, or Firm—Dan Brown Law Office; Daniel R. Brown

(57) ABSTRACT

An apparatus for concealing a light emitting video display mounted to a vertical surface by reflecting incident ambient light in mirror-like fashion. The apparatus includes a perimeter structure, which is positioned adjacent to the vertical surface about the video display. The perimeter structure has a front opening for enabling visual access to the video display. A beam-split film is disposed within the front opening, and has the characteristics of partial transmission of the light emitted by the video display and partial reflection of the incident ambient light. A fan is disposed to circulate air adjacent to the video display, and a light baffle is disposed about the perimeter structure for enabling circulation of ambient air through the perimeter structure while preventing the transmission of ambient light into the perimeter structure.

21 Claims, 6 Drawing Sheets

MIRRORED DECORATIVE VIDEO DISPLAY CONCEALMENT AND COOLING APPARATUS AND METHOD

BACKGROUND OF THE INVENTION

1. Field of the Invention

The present invention relates to video display concealment. More specifically, the present invention relates to a decorative apparatus and method for concealing a flat panel video display, which employs a one-way mirror and with forced ventilation cooling.

2. Description of the Related Art

Flat panel televisions and displays are becoming increasingly common, and will gradually replace virtually all cathode ray tube televisions and displays. Flat panel televisions and displays are frequently hung on a wall, in a fashion reminiscent of paintings and photographs. During the time when a television or display is turned on and active, this techniques works quite satisfactory because the flat panel display is viewed in a manner similar to viewing a painting or photograph. However, when the television or display is not active, the appearance of the blank screen is not aesthetically pleasing. The blank display screen renders an unaesthetic element in an environment that may otherwise be aesthetically decorated. This undesirable aspect of flat panel televisions and displays increases in proportion to the size of the viewable area of the display. Essentially, the larger the viewable area, the larger the blank space it presents in its environment when not active.

Some individuals invest a significant amount of effort and investment in decorating their homes in a particular style, including furniture, artwork, wall coverings, fixtures, and so forth. Similarly, businesses and retail stores invest in a particular decor that meets the needs or desires of their owners and customers. The presence of a large flat panel television or display is desirable while such a device is active, however, when not active, the large blank screen can interfere with an intended decor. It may then be desirable to disguise or conceal the television or display in some manner. However, concealment can be problematic in that it can interfere with access to the television or display when needed, and, concealment can interfere with the proper ventilation and cooling during operation of the device. It can also be cumbersome to reveal and conceal such items from time to time, as it is needed for viewing.

There are certain concealment coverings known in the art. It is known in the art to retract or hide the objectionable item when not in use. An example of this approach is a television screen that retracts into a furniture or fixture, and is only extended into view when the user desires view the screen. A retractable cover approach has been applied to concealment as well. A cover with a painting or photograph imprinted on it can be extended to cover a television or display when not in use, and can be retracted to reveal it when desired. However, the concealment cover itself must be decorated in some fashion, and this lead to the need for consumers to make a choice on decoration. This approach also dictates a need for a mechanism to retract and extend such a cover. Thus, there is a need in the art for an apparatus and method for providing a convenient and attractive way to conceal a flat panel television or display when not in use, and render the screen viewable when needed, which does not require a decorated cover, does not require a mechanical system to cycle during operation, and which does not interfere with the ventilation and thermal operation of the television of display that is concealed.

SUMMARY OF THE INVENTION

The need in the art is addressed by the apparatus and methods of the present invention. An apparatus for concealing a light emitting video display mounted to a vertical surface by reflecting incident ambient light in mirror-like fashion is taught. The apparatus includes a perimeter structure, which is positioned adjacent to the vertical surface about the video display. The perimeter structure has a front opening for enabling visual access to the video display. A beam-split film is disposed within the front opening, and has the characteristics of partial transmission of the light emitted by the video display and partial reflection of the incident ambient light. A fan is disposed to circulate air adjacent to the video display, and a light baffle is disposed about the perimeter structure for enabling circulation of ambient air through the perimeter structure while preventing the transmission of ambient light into the perimeter structure.

In a specific embodiment of the apparatus, the beam-split film is deposited on a glass substrate. The beam-split film may be a multiple layer dielectric material applied through vapor deposition. The multiple layer dielectric material may be comprised of a titanium-dioxide layer and a magnesium-fluoride layer. In a particular embodiment, the beam-split film provides approximately 50% transmission, 45% reflectance, and less than 5% absorption in the visible spectrum. In another embodiment, a decorative frame is disposed about the front opening. The decorative frame may support the beam-split film within the front opening and may be removably attached to the perimeter structure.

In another specific embodiment of the invention, the fan is attached to a top surface of the perimeter structure, and the fan is aligned to exhausting air from within the perimeter structure. The light baffle may be aligned with a bottom surface of the perimeter structure. In another embodiment, a fan control circuit is disposed within the perimeter structure, and is coupled to energize the fan and drives the fan at a reduced speed, thereby enabling quiet operation. In another specific embodiment, plural fans are coupled to the fan control circuit. A fan control circuit light baffle may be provided to block the visual appearance of the circuit through the front opening. The fan control circuit may also include a thermostat that energizes the fan at a predetermined temperature. In another specific embodiment, the fan control circuit operates to drive the fan at a reduced speed in response to a first predetermined temperature and to drive the fan at a full speed in response to a second predetermined temperature.

The present invention also teaches an apparatus for concealing a light emitting video display fixed to a vertical surface by reflecting incident ambient light in mirror-like fashion while the video display is not in operation. The apparatus includes a perimeter structure that is positioned adjacent to the vertical surface about the video display. The perimeter structure has a front opening that enables visual access to the video display. A decorative frame is removably attached to the perimeter structure and is disposed about the front opening. A multiple layer, vapor deposited, dielectric beam-split film is applied to a glass substrate and is supported by the decorative frame, which is disposed about the front opening. The beam-split film has the characteristics of partial transmission of the light emitted by the video display and partial reflection of the incident ambient light. The multiple layer dielectric beam-split film includes titanium-dioxide and magnesium-fluoride layers. A light baffle is disposed along the bottom surface of the perimeter structure for enabling circulation of ambient air through the perimeter structure while preventing the transmission of ambient light. Plural fans are disposed along the top surface of the perimeter structure and are aligned to exhaust air from within the perimeter structure, thereby circulating air through the light baffle and cooling the video display. A fan control circuit is disposed within the perimeter structure, and has a thermostat coupled to energize the fans at a predetermined temperature. There is a resistor coupled in series with the plural fans, which causes the plural fans to operate at reduced speed to enable quiet operation. A fan control circuit light baffle is disposed on the interior surface of the perimeter structure and is aligned to block visual perception of the fan control circuit through the front opening.

The present invention also teaches a method of concealing a light emitting video display that is mounted to a vertical surface. The method includes the steps of positioning a perimeter structure with a front opening adjacent to the vertical surface and about the video display, thereby enabling visual access to the video display through the front opening. Also, the steps of covering the front opening with a beam-split film and transmitting a portion of the light emitted by the video display during operation through the beam-split film. Then, reflecting a portion of the ambient light incident on the beam-split film, thereby concealing the video display when not in operation, and, circulating air through a light baffle disposed about the perimeter structure and adjacent to the video display with a fan, thereby enabling air cooling of the video display.

In a specific embodiment, the method includes the further step of depositing the beam-split film on a glass substrate. The method may also include the further steps of supporting the glass substrate with a decorative frame and positioning the decorative frame about the front opening. In a refinement, the step exhausting the air from the top of the perimeter structure with the fan is added. The fan may be operated at reduced speed, thereby enabling quiet operation. The fan may be energized at a predetermined temperature. In a specific embodiment, the method includes the further steps of operating the fan at a reduced speed upon detection of a first predetermined temperature, and, operating the fan at full speed upon detection of a second predetermined temperature.

DESCRIPTION OF THE INVENTION

Figure 1:
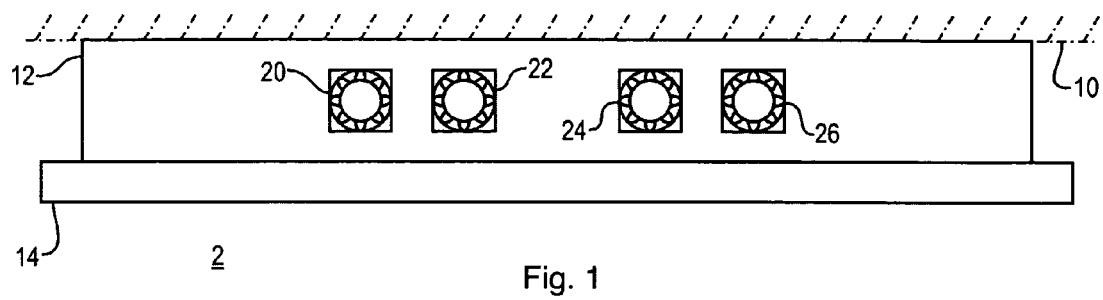
FIG. 1 is a top view drawing of a mirrored decorative video display concealment apparatus according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention advances the art in the area of decorative concealment of video displays, including televisions, flat panel televisions, computer monitors, flat panel computer monitors, still-photo active displays, and generally, all kinds of video and image displays which function by emitting light for viewing by a user. Hereinafter, generally referred to as video displays. In an illustrative embodiment, a video display is fixed to a vertical surface, such as a wall. A perimeter structure surrounds the video display, and forms the sides to an enclosure, with the vertical surface forming the rear of the enclosure. The front of the enclosure is open, so that the video display is accessible for viewing. A beam-split film is disposed on the front opening, and has the characteristics of partial transmission and partial reflectance of visible light. It also has the characteristic of low absorption of visible light. The video display is thus enclosed within these structures.

The interior surfaces of the enclosure are dark in color, using low reflectance finishes, such as flat paint. Typically, the video display is presented in an environment with a reasonable level of ambient light, such as a home, office, or commercial business. When the video display is inactive, there is typically no light emitted therefrom. Thus, the beam-split film, having a reflectance in the range of approximately 50%, appears to be a mirror when viewed from the exterior of the enclosure, since there is no light emitted from within the enclosure. At reflectance levels in this range, the mirror appears to have a slight darkening affect on the reflected light, but is generally acceptable and useful as a mirror, and doesn't significantly detract from the appearance of the room in which it is placed. A decorative frame may be placed about the periphery of the beam-split film, on the front of the enclosure, which gives system the overall appearance of a typical decorative mirror, commonly seen in homes, offices, and commercial establishments. Thus, the video display is concealed when not in operation.

When the video display is turned on, light is emitted from the display screen in the form of a video image. This image is transmitted through the beam-split film, which has visible light transmission of approximately 46%. The bright video display image easily dominates the reflected ambient light, and the video image is readily viewable by users. In typical use, users will frequently reduce the ambient light levels in the local environment, which enhance further the viewing experience of the video display. The transition from concealment to viewing is accomplish by simply turning on the video display, with no requirement to operate any concealment mechanism, thus providing a simple and convenient transition of the system. In an illustrative embodiment, the beam-split film is "tuned" to provide high transmission of the near infrared band, typically about 80%. This has two important benefits. First, it allows the infrared remote control for the video display to function reliably through the beam-split film. Second, it allows radiated heat from the video display to escape through the front opening. Heat production by the video display and its removal through conduction and convection are also addressed by the present invention, which will be fully discussed hereinafter.

The beam split film utilized in an illustrative embodiment is a multi-layer vapor deposited dielectric coating applied to annealed glass, which forms a substrate for the beam-split film. When assembled, the film is located toward the interior of the enclosure, so that routine cleaning of the surface by the user does not damage the dielectric layers. In the illustrative embodiment, the three dielectric layers are comprised of titanium-dioxide, magnesium-fluoride, and titanium-dioxide, with a total thickness of about 2000 angstroms. Those skilled in the art will appreciate that other substrate and coating layers may be used to achieve the desire reflectivity and transmission characteristics. It should be noted that the traditional half-silvered one-way mirror can be used, but will render a dimmer image of the video display, with a lower level of reflectivity when concealing the dark video display.

Reference is now directed to FIG. 1, which is a top view drawing of a mirrored decorative video display concealment apparatus 2 according to an illustrative embodiment of the present invention. In a typical application, the apparatus 2 is attached to a wall 10 in the home or office. The wall 10 also supports the video display, which is a flat panel television (not shown in FIG. 1) in the illustrative embodiment. A perimeter structure 12 surrounds the video display, and is attached to the wall, generally forming a light-tight seal between the perimeter structure 12 and the wall 10. Wall attachment techniques familiar to those skilled in the art are used. A decorative frame 14, such as a picture frame, is attached to the front of the perimeter structure 12. Plural electric fans 20, 22, 24, 26 are disposed in the top surface of the perimeter structure, and serve to exhaust air from within the enclosure defined by the perimeter structure 12, which serves to remove heat from the video display (not shown).

Figure 2:
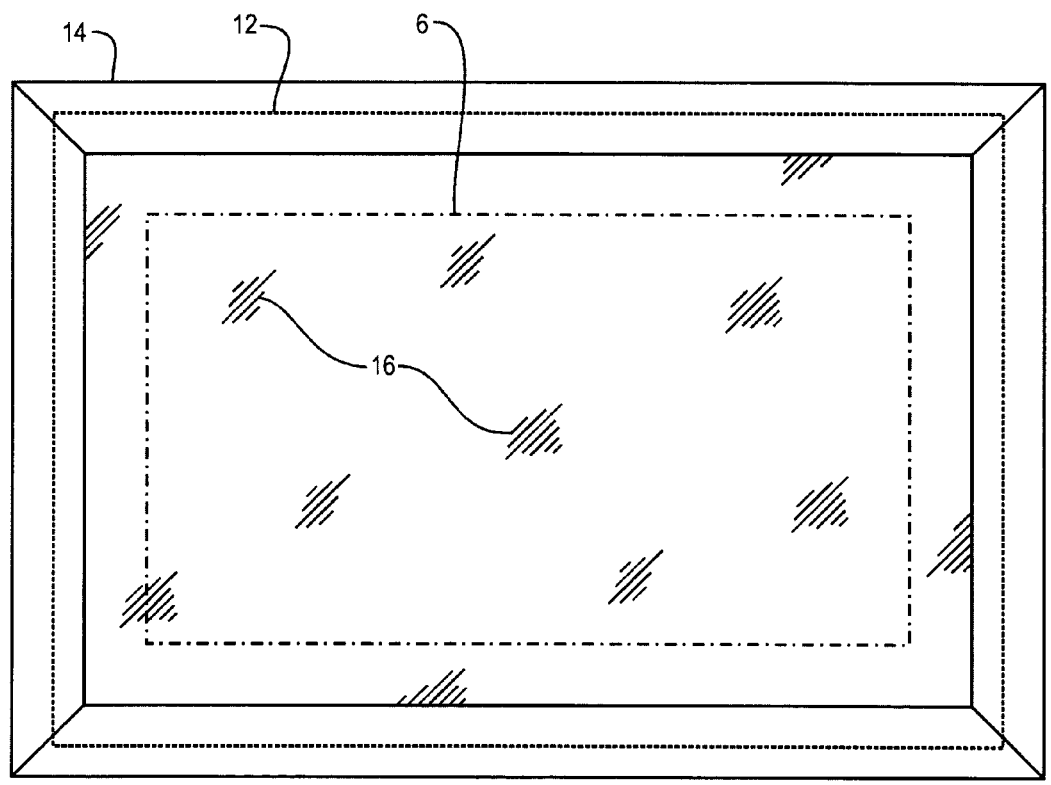
FIG. 2 is a front view drawing of a mirrored decorative video display concealment apparatus according to an illustrative embodiment of the present invention.

Reference is directed to FIG. 2, which is a front view drawing of the mirrored decorative video display concealment apparatus 2 according to an illustrative embodiment of the present invention. The decorative frame 14 forms the front outer periphery of the apparatus 2, and supports the beam-split film 16, which is deposited on a sheet of annealed glass 16. Thus, the outward appearance of the apparatus 2 is that of a decorative mirror. The outer extent of the perimeter structure 12 is illustrated, as is the viewing screen area 6 of the video display concealed behind the beam-split film 16.

Figure 3:
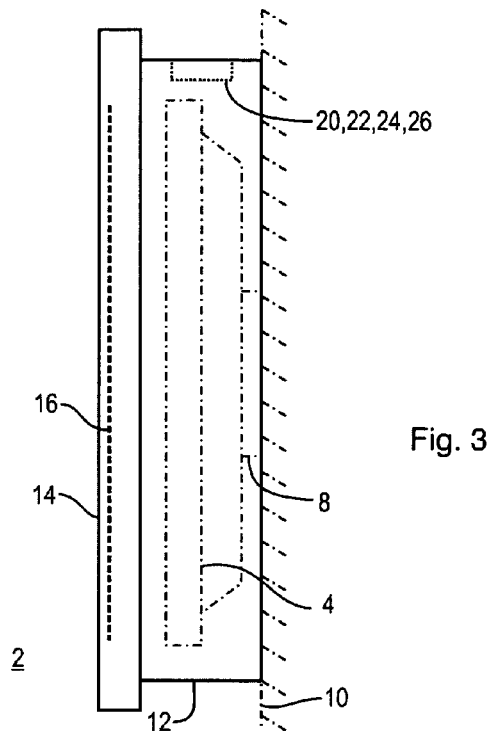
FIG. 3 is a side view drawing of a mirrored decorative video display concealment apparatus according to an illustrative embodiment of the present invention.

Reference is directed to FIG. 3, which is a side view drawing of the mirrored decorative video display concealment apparatus 2 according to an illustrative embodiment of the present invention. The perimeter structure 12 is mounted to the wall 10, forming a generally light tight seal therebetween. The video display 4, which is a flat panel television in the illustrative embodiment, is independently coupled to the wall 10 with a conventional flat panel television mount 8, which are known to those skilled in the art. The perimeter structure 12 extends away from the wall farther than the front of the video display 4, thereby forming and enclosure for the video display 4. A decorative frame 14 is attached to the perimeter structure, also forming a generally light tight seal therebetween. The beam-split film 16 is disposed about the opening at the front of the enclosure, and within an opening in the decorative frame 14, in a manner that is typical with such frames 14. Thus, the video display 4 is enclosed in a light-tight enclosure, with visual access provided though the beam-split film 16. The location of the cooling fans 20, 22, 24, 26 are shown along the top surface of the perimeter structure 12.

Figure 4:
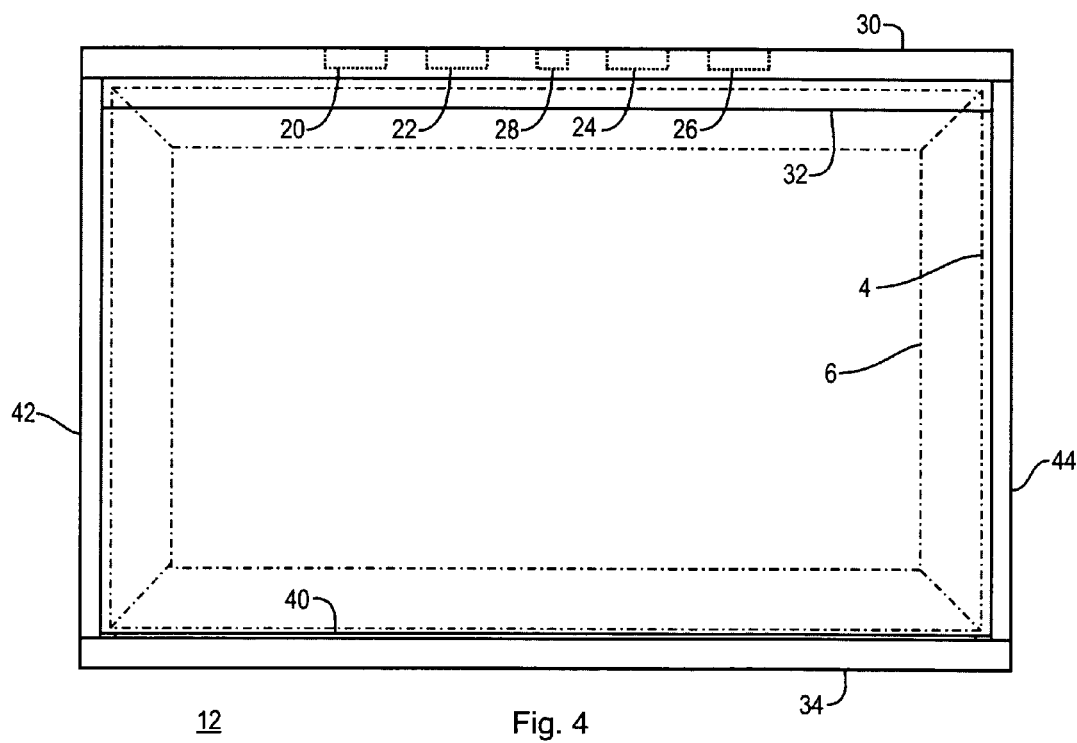
FIG. 4 is a front view drawing of the perimeter structure of a mirrored decorative video display concealment apparatus according to an illustrative embodiment of the present invention.

Reference is directed to FIG. 4, which is a front view drawing of the frame structure of the mirrored decorative video display concealment apparatus according to an illustrative embodiment of the present invention. The perimeter structure 12 is comprised of several frame elements, all of which are fabricated from black expanded PVC or aluminum alloy in the illustrative embodiment. Each aluminum component is finished in black matte power coat paint, for durability and reduced internal reflections. The sides 42, 44 of the perimeter structure are fabricated from one inch thick expanded PVC, which is a rigid board-like material that employs a selected depth to meet the depth requirements of the video display 4 that is being concealed by the apparatus. Along the bottom is aluminum angle 34 (1½" by 1½" by ⅛"). Along the top are a front aluminum angle 30 (1½" by 1½" by ⅛") and a rear aluminum angle 32 (3" by 1½" by ⅛"). The 3" leg of aluminum angle 32 provides an accessible mounting flange from coupling the perimeter structure 12 to the wall about the video display 4. The four cooling fans 20, 22, 24, 26 are shown along the top of the perimeter structure along with a wiring terminal block 28 used to interconnect that fans and fan control circuitry. A light baffle plate 40 is illustrated along the bottom of the perimeter structure 12 and adjacent to the bottom angle 34, which will be more fully described hereinafter.

Figure 5:
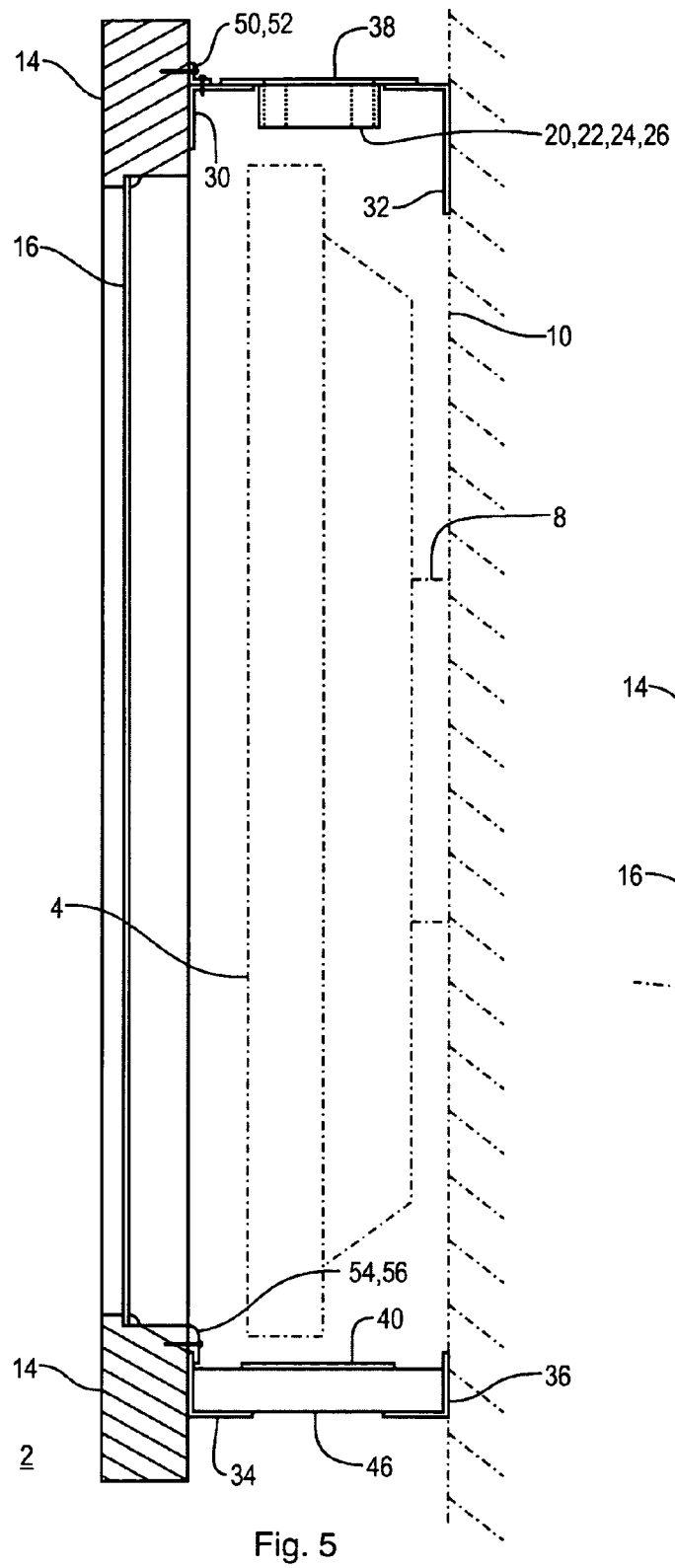
FIG. 5 is a section view drawing, looking sideways, through a mirrored decorative video display concealment apparatus according to an illustrative embodiment of the present invention.

Reference is directed to FIG. 5, which is a section view drawing, looking sideways, through the mirrored decorative video display concealment apparatus 2 according to an illustrative embodiment of the present invention. The wall 10 supports the video display 4, which is a flat panel television set in the illustrative embodiment, to the wall 10 with a convention flat panel television mount 8, The perimeter structure is comprised of four aluminum angles. On the top are a rear angle 32 and a front angle 30. On the bottom are a rear angle 36 and a front angle 34. Each of the angles are 1½" by 1½" by ⅛" aluminum alloy, except the top rear angle 32, which is a 3" by 1½" by ⅛" aluminum alloy. A ⅛" thick aluminum alloy fan mounting plate 38 covers the top of the perimeter structure, and provides a mounting surface for the fans 20, 22, 24, 26 with suitable mounting and ventilation openings formed therein. The fans are commonly referred to "box" or "muffin" fans, as are known to those skilled in the art. Since it is desirable to prevent ambient light from entering the enclosure, a preferable characteristic of the fans 20, 22, 24, 26 is that they have blades formed to overlap one another, thereby providing a light baffling effect. The fans 20, 22, 24, 26 are spaced across the top surface of the perimeter structure in a manner designed to cause even, distributed, air exhaust through the enclosure. The use of plural fans is also preferred because the fans can be operated at reduced speed, which reduced air movement noise and fan noise, while still providing adequate cooling for the video display 4.

Continuing with respect to FIG. 5, a light baffle plate 40 is supported on plural support blocks 46 above the two bottom angles 34, 36. The light baffle plate 40 extends over the entire width of the bottom, and is wider (deeper along the front-to-back dimension) than the space between the horizontal legs of angles 34 and 36, thereby providing a light baffle, while enabling air flow across the entire bottom of the perimeter structure. The plural support blocks are fabricated from 1" by 1" expanded PVC in the illustrative embodiment. The decorative frame 14 has the beam-split film and glass pane 16 mounted in the central opening, in a manner familiar to those skilled in the art. A pair of mounting clips 54, 56 are screwed into the back side of the decorative frame 14 along the bottom, and engage the vertical flange of the lower perimeter structure angle 34. A second pair of mounting clips 50, 52 are screwed into the back of the decorative frame 14 along the top, and include locator pins that engage holes formed in the top surface of front perimeter frame angle 30. The foregoing decorative frame 14 mounting arrangement enables the user to readily mount and dismount the decorative frame 14 for easy access to the video display 4.

Figure 6:
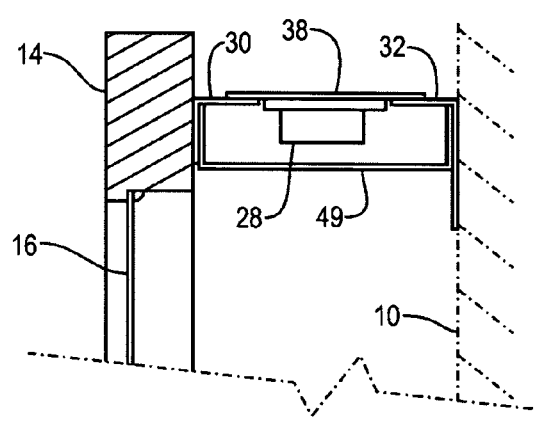
FIG. 6 is a partial section view drawing, looking sideways, through a mirrored decorative video display concealment apparatus according to an illustrative embodiment of the present invention.

Reference is directed to FIG. 6, is a partial section view drawing, looking sideways, through the mirrored decorative video display concealment apparatus 2 at the location of the wiring terminal block 28 according to an illustrative embodiment of the present invention. As noted hereinbefore, the fan wiring terminal bock 28 is located between the fans (not shown in this view) and is used to interconnect the fan control circuitry. The terminal block 28 is attached to the bottom surface of the fan mounting plate 38, which is supported from the top angles 30 and 32. The decorative frame 14 and beam-split film 16 are also visible in this partial section view. Since the terminal block includes legends and wires that are not presented in subdued colors or black, a terminal block light baffle 49 is provided to obstruct view of the terminal block 28 through the beam-split film 16. In the illustrative embodiment, the terminal block light baffle 49 is fabricated from a short section of aluminum alloy channel. The length is determined by the size of the terminal block 28, and generally should be somewhat longer than the width of the terminal block 28 so as to shield the terminal block from viewing through the beam-split film.

Figure 7:
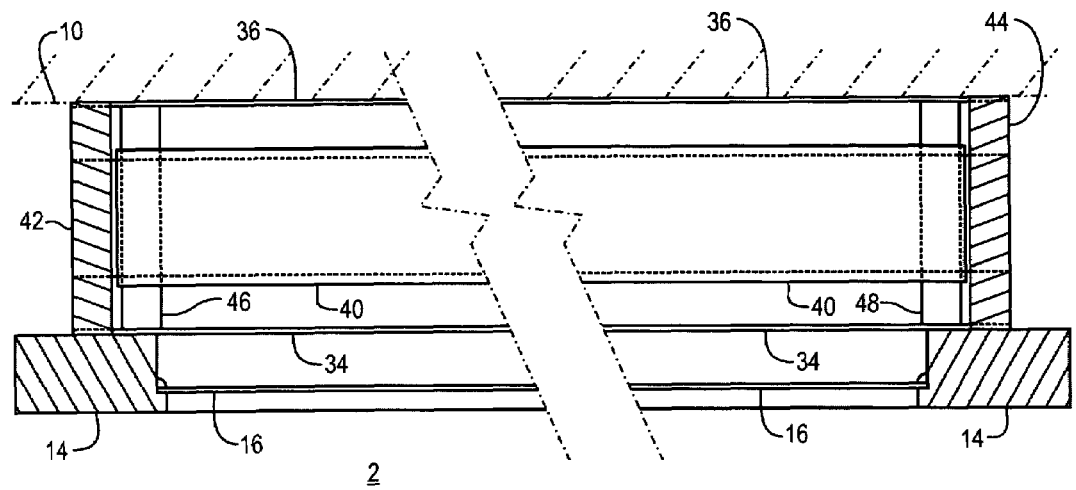
FIG. 7 is a partial section view drawing, looking down, through a mirrored decorative video display concealment apparatus according to an illustrative embodiment of the present invention.

Reference is directed to FIG. 7, which is a partial section view drawing, looking down, through the mirrored decorative video display concealment apparatus 2 according to an illustrative embodiment of the present invention. This view more fully details the perimeter structure sides 42, 44 and the light baffle plate 40 in relation to the other components of the apparatus 2. The decorative frame 14 and beam-split film 16 are visible in this partial section view. The lower rear 36 and lower front 34 aluminum angle frames are visible. The light baffle support blocks 46, 48 rest on top of the two lower angles 34, 36. The light baffle plate 40 rests on top of the support blocks 46, 48. Note that the light baffle plate 40 is slightly wider than the space between the angles 36, 36, and that the light baffle 40 extends all the way from the left side board 42 to the right side board 44, thereby providing a complete light baffle across the bottom of the enclosure. Also note that the side boards 42, 44 and the lower angle 36 form an effective light seal with the wall 10, thereby enclosing the apparatus 2 against the entry of ambient light.

Figure 8:
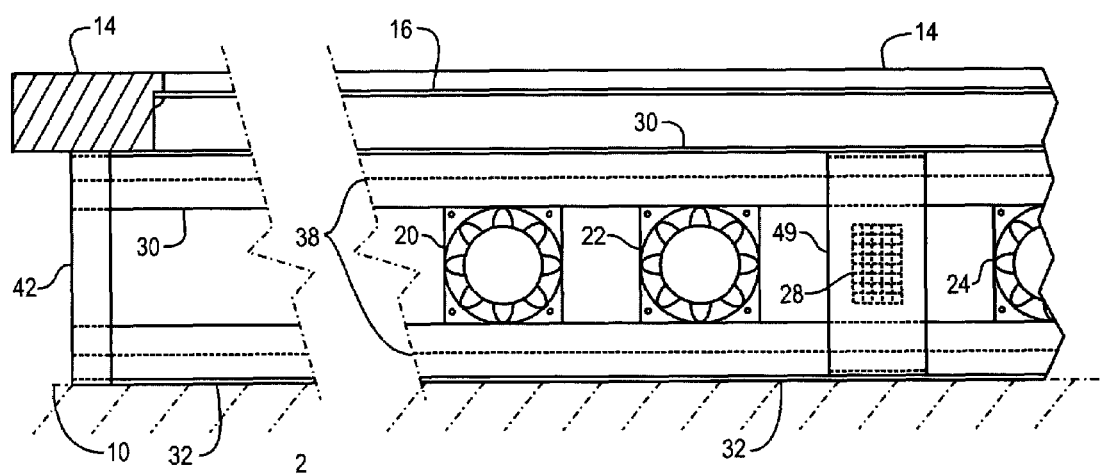
FIG. 8 is a partial section view drawing, looking up, through a mirrored decorative video display concealment apparatus according to an illustrative embodiment of the present invention.

Reference is directed to FIG. 8, which is a partial section view drawing, looking up, through the mirrored decorative video display concealment apparatus 2 according to an illustrative embodiment of the present invention. This view more fully details the fans 20, 22, 24, the wiring terminal block 28, and the terminal block light baffle 49. The decorate frame 14 and beam-split film 16 are visible in this partial section. The upper front 30 and upper rear 32 aluminum angles of the perimeter structure are shown, as well as the left side board 42. The fan mounting plate 38 rests on top of the front 30 and rear 32 angles. Three of the fans 20, 22, and 24 are visible in this partial section view, and are attached to the bottom surface of the fan mounting plate 38. The wiring terminal block 28 is also attached to the bottom surface of the fan mounting plate 38. The terminal block light baffle 49 obscures the wiring terminal block 28 from view through the beam-split film.

Figure 9:
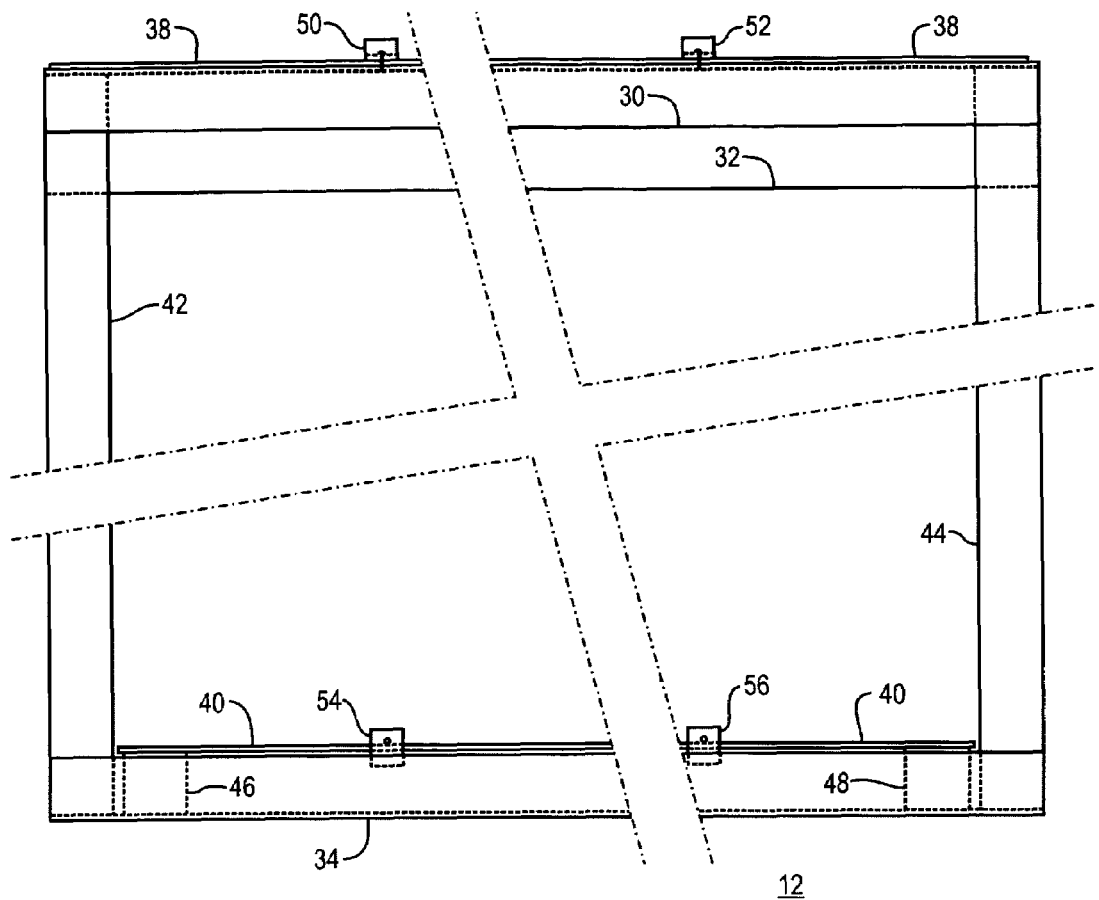
FIG. 9 is a partial front view drawing of the perimeter structure of a mirrored decorative video display concealment apparatus according to an illustrative embodiment of the present invention.

Reference is directed to FIG. 9, which is a partial front view drawing of the perimeter structure 12 frame of the mirrored decorative video display concealment apparatus according to an illustrative embodiment of the present invention. The left side board 42 and right side board 44 are fabricated from expanded PVC, and define the left and right extent of the perimeter structure 12. Along the top of the perimeter structure is the front angle 30 and the rear angle 32. The fan mounting plate 38 is placed on top of the two top angles 30, 32. The decorative frame mounting clips 50, 52 are illustrated with the aforementioned pins engaging the upper front angle 30. The front lower angle 34 defines the bottom extent of the perimeter structure 12, and the lower rear angle is hidden beyond. The light baffle mounting blocks 46, 48 rest on the horizontal flanges of the lower angles 34. The light baffle 40 rests on top of the light baffle mounting blocks 46, 48. More mounting blocks can be used for larger frame sizes, as will be apparent to those skilled in the art. The lower decorative frame mounting clips 54, 56 are illustrated, and engage the vertical flange of the lower front angle 34.

Figure 10:
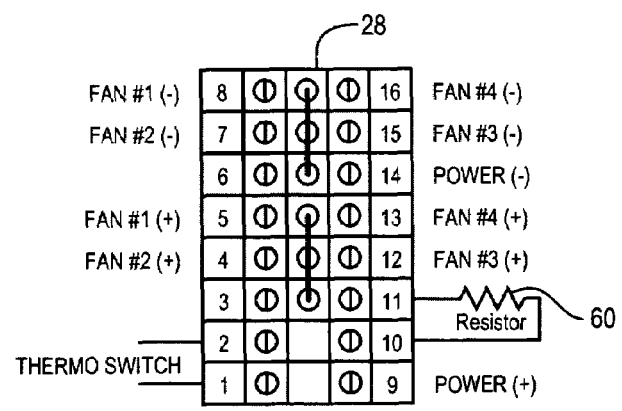
FIG. 10 is a diagram of an electrical terminal block in a mirrored decorative video display concealment apparatus according to an illustrative embodiment of the present invention.
Figure 11:
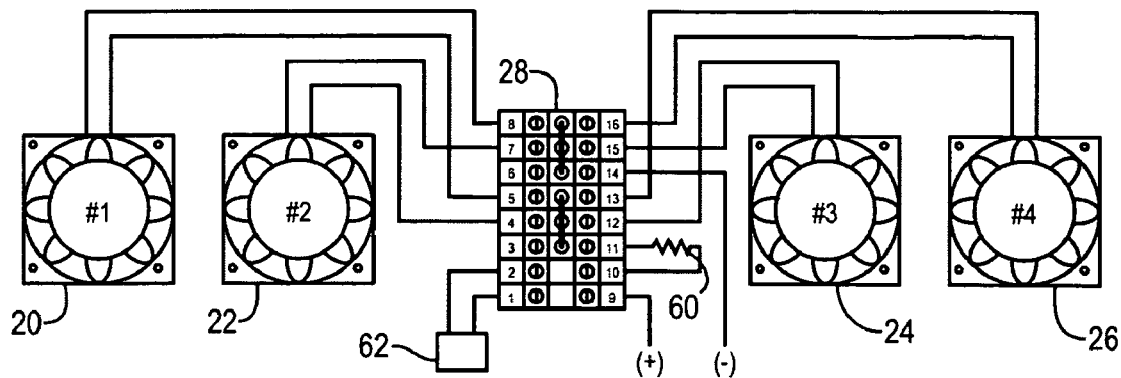
FIG. 11 is a fan wiring diagram in a mirrored decorative video display concealment apparatus according to an illustrative embodiment of the present invention.

Reference is directed to FIG. 10 and FIG. 11, which are a diagram of the wiring terminal block 28, and a wiring diagram, respectively, in the mirrored decorative video display concealment apparatus according to an illustrative embodiment of the present invention. The terminal block 28 is used to interconnect the four fans, labeled 20 Fan #1, 22 Fan #2, 24 Fan #3, and 26 Fan #4, the power supply, a resistor 60, and a thermally activated switch 62. Every terminal in each horizontal row of the terminal block 28 is electrically coupled together. The columns are electrically isolated, but are coupled according to the central column jumpers that are illustrated in FIG. 10. Thus, it is apparent that the four fans are wired in parallel, and then in series with the resistor 60, the thermal switch 62, and the power supply. When the ambient temperature in the enclosure exceeds the predetermined threshold of the thermal switch 62, then contacts in the switch 62 close and cause power supply current to flow through the resistor 60 and into the fans. Note that the resistor 60 has the effect of operating the fans at reduced speed, enabling very quiet operation of the system. The thermal switch 62 used in the illustrative embodiment may be of any suitable type as are known to those skilled in the art. The power supply (not shown) is of a type suitable for the current and voltage requirements of the fans selected. The thermal switch is preferable located near the top of the enclosure, such as adjacent to the wiring terminal block 28. In the illustrative embodiment, twelve volt direct current fans are used, and the power supply is a wall plug transformer type, as are known to those skilled in the art.

Figure 12:
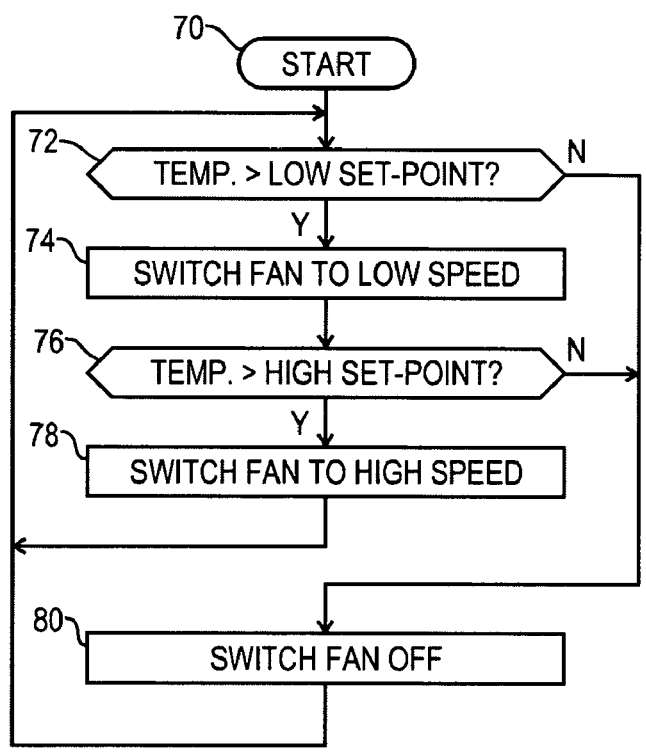
FIG. 12 is a cooling process flow diagram in a mirrored decorative video display concealment apparatus according to an illustrative embodiment of the present invention.

In another illustrative embodiment of the present invention, a two-speed fan arrangement is contemplated. In this instance, the fans are either operated at reduced speed with reduced cooling capacity, or at full speed with full cooling capacity. FIG. 12 is a cooling process flow diagram illustrating this embodiment. The process begins at step 70 and proceeds to step 72 where a test is made to determine if the low temperature set point has been reached. If not, the fans are switched off at step 80. On the other had, at step 72, is the low temperature set point has been reached, then the fans are energized to the low fan speed at step 74 and flow proceeds to step 76. At step 76, a test is made to determine if the high temperature set point has been reached. If not, the fans are switched off at step 80. On the other had, at step 76, is the high temperature set point has been reached, then the fans are energized to the high fan speed at step 78 and flow returns to step 72 to repeat the temperature testing sequence again and again over time. The same return sequence applies at step 80 where the fans were shut off. With this arrangement, the system continually monitors the enclosure temperature and adjusts the fan speed according to need.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus for concealing a light emitting video display, which is fixed to a vertical surface, when not in operation by reflection of incident ambient light, comprising:
   a perimeter structure, for positioning adjacent to the vertical surface about the video display, having a front opening for enabling visual access to the video display;
   a beam-split film, disposed within said front opening, having the characteristics of partial transmission of the light emitted by the video display and partial reflection of the incident ambient light;
   a fan disposed to circulate air adjacent to the video display, and
   a light baffle disposed about said perimeter structure for enabling circulation of ambient air through said perimeter structure while preventing the transmission of ambient light.

2. The apparatus of claim 1 wherein said beam-split film is deposited on a glass substrate.

3. The apparatus of claim 2 wherein said beam-split film is multiple layer dielectric material applied through vapor deposition.

4. The apparatus of claim 3 wherein said multiple layer dielectric material is comprised of a titanium-dioxide layer and a magnesium-fluoride layer.

5. The apparatus of claim 1 wherein said beam-split film provides approximately 50% transmission, 45% reflectance, and less than 5% absorption in the visible spectrum.

6. The apparatus of claim 1, further comprising:
   a decorative frame disposed about said front opening.

7. The apparatus of claim 6 wherein said decorative frame supports said beam-split film within said front opening and is removably attached to said perimeter structure.

8. The apparatus of claim 1 wherein said fan is attached to a top surface of said perimeter structure, and said fan is aligned to exhausting air from within said perimeter structure, and wherein said light baffle is aligned with a bottom surface of said perimeter structure.

9. The apparatus of claim 1, further comprising:
   a fan control circuit disposed within said perimeter structure, coupled to energize said fan and operable to drive said fan at a reduced speed, thereby enabling quiet operation.

10. The apparatus of claim 9, further comprising plural fans coupled to said fan control circuit.

11. The apparatus of claim 9, further comprising a fan control circuit light baffle.

12. The apparatus of claim 9 wherein said fan control circuit further comprises a thermostat, coupled to energize said fan at a predetermined temperature.

13. The apparatus of claim 9 wherein said fan control circuit is operable to drive said fan at a reduced speed in response to a first predetermined temperature and operable to drive said fan at a full speed in response to a second predetermined temperature.

14. An apparatus for concealing a light emitting video display, which is fixed to a vertical surface, when not in operation by reflection of incident ambient light, comprising:
   a perimeter structure, for positioning adjacent to the vertical surface about the video display, having a front opening for enabling visual access to the video display;
   a decorative frame removably attached to said perimeter structure and disposed about said front opening;
   a multiple layer, vapor deposited, dielectric beam-split film applied to a glass substrate and supported by said decorative frame, disposed within said front opening, having the characteristics of partial transmission of the light emitted by the video display and partial reflection of the incident ambient light, wherein said multiple layer dielectric beam-split film is comprised of titanium-dioxide and magnesium-fluoride layers;
   a light baffle disposed along the bottom surface of said perimeter structure for enabling circulation of ambient air through said perimeter structure while preventing the transmission of ambient light;
   plural fans disposed along the top surface of said perimeter structure and aligned to exhaust air from within said perimeter structure, thereby circulating air through said light baffle and about the video display;
   a fan control circuit disposed within said perimeter structure, having a thermostat coupled to energize said plural fans at a predetermined temperature, and having a resistor coupled in series with said plural fans, thereby operating said plural fans at reduced speed to enable quiet operation, and
   a fan control circuit light baffle disposed on the interior surface of said perimeter structure and aligned to block visual perception of said fan control circuit through said front opening.

15. A method of concealing a light emitting video display that is mounted to a vertical surface, comprising the steps of:
   positioning a perimeter structure having a front opening adjacent to the vertical surface about the video display, thereby enabling visual access to the video display through the front opening;
   covering the front opening with a beam-split film;
   transmitting a portion of the light emitted by the video display during operation through a beam-split film;
   reflecting a portion of the ambient light incident on the beam-split film, thereby concealing the video display when not in operation;
   circulating air through a light baffle disposed about the perimeter structure and adjacent to the video display with a fan, thereby enabling air cooling of the video display.

16. The method of claim 15 further comprising the step of depositing the beam-split film on a glass substrate.

17. The method of claim 16, further comprising the steps of supporting the glass substrate with a decorative frame and positioning the decorative frame about the front opening.

18. The method of claim 15 further comprising the step exhausting the air from the top of the perimeter structure with the fan.

19. The method of claim 15, further comprising the step of operating the fan at a reduced speed, thereby enabling quiet operation.

20. The method of claim 15 further comprising the step of energizing the fan at a predetermined temperature.

21. The method of claim 15 further comprising the steps of:
operating the fan at a reduced speed upon detection of a first predetermined temperature, and
operating the fan at full speed upon detection of a second predetermined temperature.

* * * * *